PROCESS FOR TREATING EXCREMENT BY MICROORGANISMS AND PRODUCTS OBTAINED THEREBY
Filed April 4, 1968
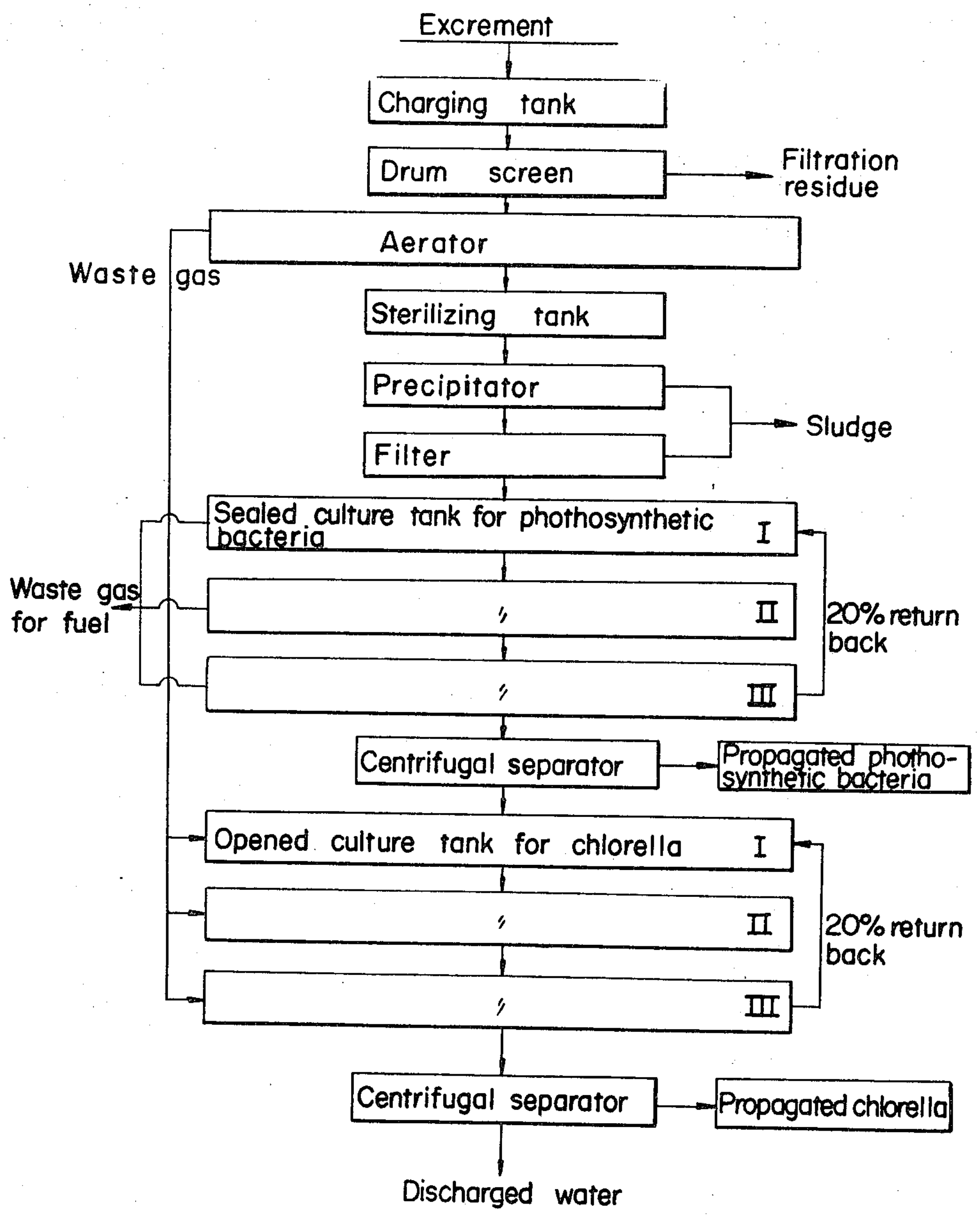

United States Patent Office 3,546,812

Patented Dec. 15, 1970

3,546,812

PROCESS FOR TREATING EXCREMENT BY MICROORGANISMS AND PRODUCTS OBTAINED THEREBY

Masayasu Kobayashi, Ohaza-Higoshi, Michiharu Kobayashi, Kyoto, and Mitsuyoshi Matsushima, Maebashi, Japan, assignors to City of Kiryu, Kiryu, Japan

Filed Apr. 4, 1968, Ser. No. 718,727

Claims priority, application Japan, Feb. 9, 1968, 43/7,911

Int. Cl. A01h *13/00*

U.S. Cl. 47—1.4 13 Claims

ABSTRACT OF THE DISCLOSURE

Purification of excrement collected in city, which comprises firstly decomposing said excrement by heterotrophic microorganisms under aerobic condition into organic acids, amino acids and the other lower molecular weight substances, secondly inoculating and cultivating photosynthetic bacteria in said decomposed excrement in a sealed culture tank under anaerobic, light condition and thirdly cultivating chlorella in the resulting excrement under aerobic, light condition.

The present invention relates to a process for treating excrement by using photosynthetic bacteria, such as Athiorhodaceae and Thiorhodaceae, and Chlorella and the products produced by said microorganisms, which can be used for feed and fertilizer.

The hitherto used process for treating excrement involves charging excrement collected by vacuum car and excrement for about one month to effect anaerobic decomposition and then introducing into an aeration type purifying facilities to effect purification. However, as well known, in this method excrement must be left to stand for about one month, so that this method has defects that a long time is necessary and the disposal facilities need a wide space and further excrement, which is organic materials having a high energy is thrown away without being utilized.

Alternatively, an activated sludge process, a chemically treating process, a wet-type burning process, etc., have been attempted, but these processes have not been yet satisfied and also in these processes excrement is thrown away without being utilized.

Recently, a process for treating excrement, in which organic materials in excrement is utilized by Chlorella, has been proposed. This process can attain two purposes of purification of excrement and harvest of Chlorella celles, while this process has a disadvantage that excrement must be diluted to a concentration of about 10 to 20 times in the treatment and there has been a problem in practice.

With these problems in mind, the inventors have made studies on the treatment of excrement by means of microorganisms systematically and the present invention has been accomplished.

Namely, the inventors have checked cycle of purification in the natural world and paid an attention to the fact that growable microorganism varies according to putrefaction degree of sewage, that is, in a stage of a high putrefaction degree. Heterotrophic microorganisms propagate, in the next stage, photosynthetic bacteria propagate and in the last stage of a low putrefaction degree Chlorophyceae propagates, and found that excrement shows the same phenomenon as described above and that if microorganisms, which can propagate most favourably in each stage are selected and cultivated in excrement, the excrement can be purified in a short time to produce useful by-products.

Furthermore, the inventors have paid an attention to the fact that photosynthetic bacteria can utilize organic acids in a solution having B.O.D. value (Biological Oxygen Demand Value) as high as 3,000 to 15,000 p.p.m. and propagate highly in such a solution to decrease B.O.D. value to 300 to 500 p.p.m. after the propagation and further that Chlorella propagates highy in the solution after the cultivation of photosynthetic bacteria to decrease B.O.D. value to about 5 to 50 p.p.m., and found that if photosynthetic bacteria are cultivated in excrement, in which organic acids and other lower molecular weight substances have been formed and then Chlorella is cultivated in the solution after photosynthetic bacteria were cultivated, excrement can be purified in a short period without diluting excrement and each of said microorganisms can be obtained in a large amount.

The method of the present invention has been accomplished based on the above described discovery and is characterized in that excrement is firstly decomposed under aerobic atmosphere to form organic acids and other lower molecular weight substances and then the decomposed excrement is transferred into a sealed culture tank and inoculated with photosynthetic bacteria, which are cultivated under anaerobic atmosphere while irradiating light and then collected, after which the thus treated excrement is transferred into an aerobic culture tank and inoculated with Chlorella, which is cultivated while irradiating light and collected, whereby the excrement is purified. Furthermore, the present invention consists in the use of the cultivated photosynthetic bacteria and Chlorella for feed of fishes and animals and fertilizer.

An outline of properties of photosynthetic bacteria to be used in the present invention will be mentioned and then the mycological properties will be explained.

Photosynthetic bacteria are classified into the following three families according to "Bergery's Manual of Determinative Bacteriology, 7th Edition"

(I) Athiorhodaceae
(II) Thiorhodaceae
(III) Chlorobacteriaceae

Athiorhodaceae can utilize organic materials, such as lower fatty acids (saturated and unsaturated fatty acids) and effect photosynthesis by using light energy (for example, $$CO_2+2H_2A \xrightarrow{\text{light}} CH_2O+H_2O+2A)$$

Thiorhodaceae and Chlorobacteriaceae can utilize mainly sulfides or hydrogen gas and effect photosynthesis by using light energy (for example, $$2H_2S + CO_2 \xrightarrow{\text{light}} 2S + CH_2O + H_2O)$$

In order to effect the above described photosynthesis, the bacteria belonging to the families I and II contain Bacteriochlorophyll and the bacteria belonging to the family III contains Bacterioviligin.

The bacterial belonging ot the family II utilize sulfides and then accumulate sulfur particle in the body, while the bacteria belonging to the family III discharge sulfur particle out of the body. However, some bacteria belonging to the family III accumulate sulfur particle in the body.

The reason, why the bacteria belonging to families I and II show red, is based on pigments of Carotenoid series. The distribution of the above described photosynthetic bacteria in natural world is very wide and said photosynthetic bacterial live in submerged condition in tropics and subtropics, for example, paddy, ditch, river, lake, sea, hot spring, etc.

Then, mycological properties of photosynthetic bacteria collected by the inventors will be mentioned.

(I) Athiorhodaceae is classified into the following genus and species:

(1) Rhodopseudomonas
  (i) *capsulatus*
  (ii) *palustris*
  (iii) *gelatinosa*
  (iv) *spheroides*
(2) Rhodospirillum
  (i) *rubrum*

The morphological characteristics, growth condition and physiological properties of the above genera will be explained.

(1) Rhodopseudomonas
  (i) *capsulatus*
    (a) Morphological characteristics: This bacterium has a flagellum and is very rich in the motility and usually, short bacillus (width 0.5μ x length 1.0μ), but may be long bacillus (width 0.5–0.7μ x length 6.0μ) according to the kind of liquid culture and the period of culture. Namely, this bacterium shows pleomorphism.
    (b) Growth condition.—State of growth in various media (under anaerobic, light condition):

Buillon medium+
Aqueous pepton solution +++
Potato medium—
Thiosulfate—
Alanine+
Leucine—
Asparagine+
Aspartic acid—
Lactic acid++
Succinic acid+
Malic acid+
Butyric acid++
Crotonic acid+
Pyruvic acid++
Ethanol—
Mannitol—
Glutamic acid+
Tartaric acid—
Citric acid—
Glutaric acid+
Acetic acid+
Propionic acid+++
Sorbitol—
Glucose+
Mannose—
Fructose+
Glycerol—
(Every concentration is 0.2% with respect to substrate.)

Note: +++→good growth, +→growth, —→no growth.

(c) Physiological property:
      (1) Optimum condition for growth.—pH: 7.2, temperature: 27° C., under anaerobic, light condition (10,000 Lux).

(2) Growable condition.—pH: 6.0 to 8.5, temperature: 23—39° C., aerobic—anaerobic atmosphere, dark—irradiation of light.
      (3) Gram staining is negative.
      (4) This bacterium has acid resistance.
      (5) Indole is not formed.
      (6) Hydrogen sulfide is not formed.
      (7) This bacterium has ability for fixing molecular nitrogen.
      (8) Catalase is formed.
      (9) Gelatine is not liquefied.
      (10) Starch is not hydrolyzed.
      (11) This bacterium has ability for oxidizing reduced methylene blue and reduced methyl (or benzyl) biologene dyes.
      (12) Biotin, thiamine and nicotinic acid are necessary as the growth factor.

(ii) *palustris*
    (a) Morphological characteristics: The young culture has flagellum and motility and is bacillus (width 0.5μ x length 1.0–2.0μ), while the old culture shows pleomorphism and may have a length more than 10μ.
    (b) Growth condition.—State of growth in various media (under anaerobic, light condition):

Buillon medium—
Aqueous peptone solutoin±
Potato medium—
Thiosulfate+
Alanine±
Leucine±
Asparagine±
Asparatic acid±
Glutamic acid±
Tartaric acid—
Citric acid—
Glutaric acid+++
Acetic acid+
Propionic acid+
Lactic acid+
Succinic acid+
Malic acid+
Butyric acid+
Crotonic acid+
Pyruvic acid+
Ethanol+++
Mannitol—
Sorbitol—
Glucose—
Mannose—
Fructose—
Glycerol±
(Every concentration is 0.2% with respect to substrate.)

Note: +++→good growth, +→growth, ±→there are both cases of growth and no growth, —→no growth.

(c) Physiological properties:
      (1) Optimum condition for growth.—pH: 7.5, temperature: 30° C., under anaerobic, light condition (10,000 Lux.)
      (12) p-Amino benzoic acid is necessary as the growth factor. The other points are the same as the physiological properties of the above described capsulatus.

(iii) *gelatinosa*
    (a) Morphological characteristics: The young culture has flagellum and motility and is short bacillus (width 0.5μ x length 1.0–2.0μ), while the old culture has sometimes a length of 10μ.
    (b) Growth condition.—State of growth in various media (under anaerobic, light condition):

Buillon medium+
Aqueous peptone solution+++
Potato medium±
Thiosulfate—
Alanine+
Leucine±
Asparagine+++
Aspartic acid+
Glutamic acid+
Tartaric acid—
Citric acid+
Glutaric acid±
Acetic acid+
Propionic acid—
Lactic acid+
Succinic acid+
Malic acid+
Butyric acid+
Crotonic acid+
Pyruvic acid+
Ethanol+
Mannitol—
Sorbitol—
Glucose+
Mannose+
Fructose+
Glycerol—

(Every concentration is 0.2% with respect to substrate.)

Note: +++→good growth, +→growth, ±→there are both cases of growth and no growth, —→no growth.

(c) Physiological properties:
(9) Gelatine is liquefied.
(12) Biotin and thiamine are necessary as the growth factor. The other points are the same as the physiological properties of the above described capsulatus.

(iv) *spheroides*
(a) Morphological characteristics: The young culture has flagellum and motility and usually spherobacterium (0.7$\mu$) and shows pleomorphism. The like of spore is recognized in the bacteria.
(b) Growth condition: State of growth in various media (under anaerobic, light condition).

Buillon medium±
Aqueous peptone solution±
Potato medium—
Thiosulfate—
Alanine±
Leucine±
Asparagine±
Aspartic acid±
Glutamic acid±
Tartaric acid+
Citric acid—
Glutaric acid+
Acetic acid+
Propionic acid—
Lactic acid+
Succinic acid+
Malic acid+
Butyric acid+
Crotonic acid+
Pyruvic acid+
Ehthanol+
Mannitol+
Sorbitol+
Glucose+
Mannose+
Fructose+
Glycerol+

(Every concentration is 0.2% with respect to substrate.)

Note: ±→good growth, ±→there are both cases of growth, and no growth, —→no growth.

(c) Physiological properties: The properties are the same as the physiological properties of the above described capsulatus.

(2) Rhodospirillum
(i) *rubrum*
(a) Morphological characteristics: The bacterium of the young culture has flagellum and motility, and is spirillum (with 0.5–1.5$\mu$ x length 2.0–5.0$\mu$) and shows pleomorphism.
(b) Growth condition: State of growth in various media (under anaerobic, light condition).

Buillon medium+
Aqueous peptone solution+
Potato medium—
Thiosulfate—
Alanine+
Leucine±
Asparagine+
Aspartic acid+
Glutamic acid+
Tartaric acid—
Citric acid—
Glutaric acid—
Acetic acid+
Propionic acid—
Lactic acid+
Succinic acid+
Malic acid+
Butyric acid+
Crotonic acid+
Pyruvic acid+
Ethanol+
Mannitol—
Sorbitol—
Glucose±
Mannose—
Fructose—
Glycerol—

(Every concentration is 0.2% with respect to substrate).

Note: +→good growth, ±→there is both cases of growth and no growth, —→no growth.

Rhodospirillum is further classified into *fulvum, molischianum* and *photometricum,* but they cannot be distinguished clearly.

(II) Thiorhodaceae can be classified into the following genera.
(1) Thiosarcina
(2) Thiopedia
(3) Thiocapsa
(4) Thiodictyon
(5) Thiothece
(6) Thiocystis
(7) Lamprocystis
(8) Amoebobacter
(9) Thiopolycoccus
(10) Thiospirillum
(11) Rhabdomonus
(12) Rhodothece
(13) Chromatium This classification is followed to the literature, which has been published in the eighteen-hundreds and there are many indistinct points. Namely, for example, the bacteria of these genera have a size of 0.5$\mu$ to 15$\mu$ and the pH value is about 7.8–8.5 and these features are common in all the genera and it is impossible to distinguish these genera with each other. Accordingly, the inventors have used Thiospirillum of spirillum, Rhodothece of sphero-bacterium or bacillus having no motility and Chromatium of short bacillus having motility in the method of the present invention. In practice, said bacteria are naturally incorporated in excrement from natural world and grow during the treatment of excrement. The morphological characteristics, physiological properties and growth condition of the genera used in the present invention will be explained.

(1) Thiospirillum (a) Morphological characteristics: This bacterium is spiral and has flagellum and motility and grows highly if there are hydrogen sulfide and light and sulfur particle is accumulated in the bacterium body. This bacterium has a width of 1.5–2.5μ and a length of 30–40μ and some of the old cultures reach a length of 100μ.

(b) Growth conditions: State of growth in various media (under anaerobic, light condition.)

Buillon medium—
Aqueous peptone solution—
Potato medium—
Thiosulfate+
Sodium propionate—
Sodium malate—
Sodium succinate—
Glucose—
Ethanol—

(Every concentration is 0.2% with respect to substrate.)
Note: +→growth, —→no growth.

(c) Physiological properties:

(1) Optimum condition for growth.—pH: 8.2, temperature: 30° C., under anaerobic, light condition (10,000 Lux).
(2) Growable condition.—pH: 7.6–8.8, temperature: 25–40° C., under irradiation of light.
(3) Gram staining is negative.
(4) This bacterium has less acid resistance.
(5) Indole is not formed.
(6) Hydrogen sulfide is very highly used.
(7) This bacterium has ability for fixing nitrogen.
(8) This bacterium does not grow in nitrate medium.
(9) Catalase is formed.
(10) Gelatine is not liquefied.
(11) Starch is not hydrolyzed.
(12) Oxidation of reduced methyl (or benzyl) biologene dye is effected.
(13) Vitamin is not required.

(2) Rhodothece (a) Morphological characteristics: This bacterium is spherical or bacilliform (1.8–2.5μ), and has no motility.
(b) Growth condition: same as Thiospirillum.
(c) Physiological properties: same as Thiospirillum.

(3) Chromatium (a) Morphological characteristics: This bacterium is usually oval or short bacilliform (width 1–4μ x length 2–10μ) and has motility by flagellum.

(b) Growth condition.—State of growth in various media (under anaerobic, light condition):

Buillon medium—
Aqueous peptone solution±
Potato medium—
Thiosulfate+
Sodium propionate—
Sodium malate+
Sodium succinate+
Glucose—
Ethanol—

(Every concentration is 0.2% with respect to substrate.)
Note: +→growth, ±→there are both cases of growth and no growth, —→no growth.

(c) Physiological properties: same as Thiospirillum.

(III) Chlorobacteriaceae is classified into the following genera:

(1) Chlorobium
(2) Pelodictyon
(3) Clathrochloris
(4) Chlorobacterium
(5) Chlorochromatium
(6) Cylindrogloea The above classification is made according to the above described literature, but there are many ambiguous points, so that the inventors separated bacteria, which are considered as Chlorobium, and used said bacteria. This bacterium does not grow so well in the treating excrement but grows on the wall of the tank, where light is irradiated.

The morphological characteristics, growth condition and physiological properties of Chlorobium will be explained.

(a) Morphological characteristics: The bacteria in the families I and II are red, while the bacteria of this family are green and usually oval or short bacilliform width 0.7–0.9μ x length 1.5μ), bit often show pleomorphism. This bacterium does not contain sulfur particle. When hydrogen sulfide is a substrate, this bacterium oxidizes hydrogen sulfide and accumulates sulfur in the outside of bacterium, but further the sulfur to sulfate.

(b) Growth condition.—State of growth in various media (under anaerobic, light condition):

Buillon medium—
Aqueous peptone solution—
Potato medium—
Thiosulfate+
Tetrathionate+
Sodium propionate—
Sodium malate—
Sodium succinate—
Glucose—
Ethanol—

(Every concentration is 0.2% with respect to substrate.)
Note: +→growth, —→no growth.

(c) Physiological properties:

(1) Optimum condition for growth.—pH: 4.5, temperature: 27° C., under anaerobic light condition (10,000 Lux).
(2) Growable condition.—pH: 3.0–8.0, temperature: 22–35° C., under anaerobic, light condition.
(3) Gram staining is negative.
(4) This bacterium has acid resistance.
(5) Indole is not formed.
(6) Hydrogen sulfide is very highly utilized.
(7) Some bacteria have ability for fixing molecular nitrogen.
(8) Growth is not good in nitrate medium.
(9) Some bacteria form catalase.
(10) Gelatine is not liquefied.
(11) Starch is not hydrolyzed.
(12) Some bacteria have ability for oxidizing reduced methyl (or benzyl) biologene dye.
(13) Vitamin is not required.

As Chlorophyceae, use is mainly made of Chlorella and Scenedesmus among chlorococcales and they are classified into a few tens species respectively. Typical species may be mentioned as follows:

(1) Chlorella:
  (i) *vulgaria*
  (ii) *pyrenoidosa*
  (iii) *conglomerata*
  (iv) *ellipsodidea*

(2) Scenedesmus:
  (i) *obliguns*
  (ii) *acuminatus*
  (iii) *incrasatulus*
  (iv) *aculeolatus*

In the present invention, a mixture of these species is used. The morphological characteristics and the growth condition have been well-known, so that the explanation therefor will be omitted and the physiological properties will be mentioned hereinafter.

(1) Optimum condition for growth.—pH: 6.5, temperature: 25° C., under aerobic, light condition (air containing 0.5% $CO_2$ is blown; 10,000 Lux).

(2) Growable condition.—pH: 5.5 to 9.5, temperature: 5 to 35° C., under aerobic, light and dark condition.

(3) An inorganic nutrition is mainly effected, but an organic nutrition may be effected, if the species adapted to organic acids and carbohydrates of lower molecule under dark condition, are used.

(4) Though it is not proper to call as "growth factor," these species propagate linearly in the presence of iron ion by addition of vanadine, while the presence of heavy metals generally retards the growth.

For a better understanding of the invention reference is made to the accompanying drawing, wherein A single figure is a flow diagram of an embodiment for carrying out the method of the present invention.

As shown in the drawing, excrement collected by vacuum car and the like is charged into a charging tank. Then, foreign elements are filtered by a drum screen and the like, and the filtrate is transferred into an aerator and air is blown therein while maintaining the temperature at about 35 to 39° C. and stirring for 1–2 days, whereby the excrement is decomposed by Heterotrophic microorganisms into organic acids, amino acids and the other lower molecular weight substances (the concentration of organic acids in the thus treated excrement is about 2,500 p.p.m.–6,000 p.p.m.), which are most favorable nutritional source for photosynthetic bacteria. Moreover, B.O.D. value of the thus treated excrement is decreased by about ⅕ with respect to the value before the excrement is transferred into the aerator (B.O.D. value: about 10,000→2,000 p.p.m.). Furthermore, anaerobic bacteria in the excrement are almost destroyed in this step (the spore remains, but the propagating bacteria are very few).

In this step, foaming phenomenon occurs, so that it is preferable to effect a defoaming by spreading a defoaming agent, a surfactant, by spraying recycled excrement or by blowing air on the liquid surface. The formed gas includes carbonic acid gas, indole, scatole, ammonium, etc., so that said gas can be used for preventing bad odor and propagating Chlorella by feeding into a following culture tank for Chlorella.

The excrement generated organic acids, etc. in the above described step is transferred into a sterilizing tank, wherein various impure bacteria in the excrement are destroyed by a high pressure or intermittent sterilization or an irradiation of $\gamma$-ray or ultraviolet ray or a sonication and then introduced into a precipitator. In this case, if a treatment with enzymes, such as, cellulase, amylase, protease, lipase, etc., is effected, organic acids, amino acids and other substances, which can be utilized by photosynthetic bacteria, can be accumulated in a large amount and photosynthetic bacteria are very favourably cultivated and a formation of bad odor can be prevented in the following culture tank for photosynthetic bacteria.

In the precipitator, the excrement is left to stand for about 12 hours to separate the excrement from sludge and the sludge is removed. The thus treated excrement is further clarified by a filter and the like and then transferred into a sealed culture tank for photosynthetic bacteria. In this case, the pH value may somewhat vary according to the content of the excrement, so that it is preferably to adjust the pH value to about 7.0.

The conditions for cultivating the photosynthetic bacteria in the culture tank are as follows: anaerobic atmosphere, temperature: about 30° C.; under irradiation of light, culture time: about 72–96 hours. When the photosynthetic bacteria are inoculated (the original concentration of bacteria in the excrement is 2 ml./l. in the optimum V.P. (packed cell volume) and usually more than 0.5 ml./l.) and cultivated under such conditions, the photosynthetic bacteria take up the organic acids, amino acids and the other substances and propagate. In this case, it is preferable that the culture tank is a completely sealed type, but as a simplified process it is acceptable to shut out air by spreading liquid paraffin or edible oil on the liquid surface. The irradiation of light is fulfilled by sun light in the daytime, while in night, an artificial light, such as, fluorescent lamp is used, and in this case said irradiation may be effected every two hours. Furthermore, the use of sterilizing lamp together with fluorescent lamp prevent effectively contamination of impure bacteria into the produced photosynthetic bacteria.

When the method of the present invention is carried out commercially, the efficiency of the culture can be enhanced by using a multi-stage culture tank connected several sealed culture tanks and effecting the culture while transferring the excrement successively in a residence time of one tank being about 24 hours. In this case, if about 20% of the cultivated solution in the last culture tank is returned to the first culture tank as the seed bacteria (by such means, it is possible to make the concentration of the bacteria V.P. more than 0.5 ml.), the inoculation of the photosynthetic bacteria can be effected continuously and automatically. The waste gas formed in this step consists mainly of hydrogen gas, so that this gas can be used as fuel.

Then the excrement, after the photosynthetic bacteria propagated, is subjected to a centrifugal separator (for example, 20,000 to 30,000× $g$) to separate the excrement from the bacteria. About 5 to 8 g. (undried) of the bacteria can be obtained based on 1 l. of excrement and the B.O.D. value of the separated excrement is decreased by about ⅕ with respect to the value before the photosynthetic bacteria are cultivated (about 2,000 p.p.m.→about 400 p.p.m.) and the concentration of organic acids is decreased by about $\frac{1}{20}$ with respect to the value before the cultivation (about 6,000 p.p.m.→about 300 p.p.m.). In this case, as a process for concentrating the cultivated photosynthetic bacteria, if a capillary filtration process is used, the cost becomes low. The filtrate contains somewhat the photosynthetic bacteria, but such photosynthetic bacteria rather promote the progagation of Chlorella in the following culture tank for Chlorella and are not harmful. The excrement separated the photosynthetic bacteria is charged into an aerobic culture tank for Chlorella and Chlorella is inoculated therein (the original concentration of bacteria based on culture medium (V.P.) is 2.0 ml. in the optimum concentration and usually more than 0.5 ml.) and cultivated at a temperature about 25° C. under irradiation of light for 3 to 5 days. As described above, the excrement, after the photosynthetic bacteria are cultivated, decreases in B.O.D. value and the concentration of organic acids and further contains amino acids, such as lysine, histidine, arginine, asparatic acid, threonine, methionine, etc., nuclei acids, such as, adenine, guanine, uracil, cytosine, uridine, adenosine, adenosine diphosphate, vitamins, pigments of carotenoid series, etc. which are metabolites of the photosynthetic bacteria, so that such an excrement is most preferable as culture solution for Chlorella and can propagate Chlorella.

Furthermore, if air containing 5% carbon dioxide or the waste gas formed in the aeration of the raw excrement is introduced into the culture tank for Chlorella, the yield of Chlorella can be increased. Although the culture tank for Chlorella may be an open type, if said tank is composed of a sealed type and an aeration is effected therein, such a system is convenient in view of control of temperature and prevention of bad odor.

Also, in the case of culture of Chlorella, if a multistage culture system composed of a few connected culture tanks is used as in the culture of photosynthetic bacteria, and the culture is effected while transferring the excrement successively in a residence time of one tank being about 36 hours, the efficiency of culture is improved and when the present invention is carried out commercially, such a system is advantageous. Also, in this case, about 20% of the cultivated solution in the final culture tank is returned to the first culture tank as the seed bacteria as in the case of the former step (the concentration of bacteria V.P. is more than 0.5 ml.).

The excrement, after Chlorella propagated, is subjected to a centrifugal separator, for example, of 15,000× *g* (it is advantageous to previously concentrate the excrement by Deraval type separator) to separate the excrement from the bacteria. About 2 to 4 g. of Chlorella (undried) are obtained on 1 l. of the excrement and B.O.D. value of the separated excrement is decreased by about 1/10 with respect to the value before Chlorella is cultivated (about 400 p.p.m.→3 0p.p.m.) and the concentration of organic acids is decreased by about 1/21 with respect to the value before the cultivation (about 300 p.p.m.→less than 20 p.p.m.).

Accordingly, the excrement, after Chlorella is separated, is very low in B.O.D. value and the concentration of organic acids as mentioned above, so that the thus treated excrement can be discharged into river and the like without danger of public nuisance.

The photosynthetic bacteria and Chlorella manufactured in these treatment can be utilized as feeds for fishes and animals and further as an organic fertilizer and the general composition will be exemplified in the following table:

| Sample | Crude protein, percent | Crude fat, percent | Soluble carbohydrate, percent | Crude fiber, percent | Ash, percent |
|---|---|---|---|---|---|
| Rhodopseudomonas capsulatus | 57.95 | 7.91 | 20.83 | 2.92 | 4.40 |
| Chlorella | 53.76 | 6.31 | 19.28 | 10.33 | 1.52 |

Furthermore, an explanation will be made with respect to a part of vitamins, with respect to 100 g. of the photosynthetic bacteria and Chlorella, provitamin A (I.U.) is 86,400 and 35,800, ascorbic acid is 161 and 230 and Vitamin $B_{12}$($\mu$g.) is 280 and 27.0 respectively.

The composition of amino acids with respect to 100 g. of the photosynthetic bacteria and Chlorella is shown in the following table:

| | Photosynthetic bacteria | Chlorella |
|---|---|---|
| Lysine | 2.86 | 2.71 |
| Histidine | 1.25 | 1.06 |
| Arginine | 3.35 | 3.24 |
| Asparatic acid | 4.56 | 4.74 |
| Threonine | 2.70 | 2.28 |
| Serine | 1.68 | 2.12 |
| Glutamic acid | 5.34 | 4.62 |
| Proline | 2.80 | 2.12 |
| Glycine | 2.41 | 2.28 |
| Alanine | 4.65 | 2.98 |
| Valine | 3.51 | 3.02 |
| Methionine | 1.58 | 0.27 |
| iso-Leucine | 2.64 | 2.44 |
| Leucine | 4.50 | 4.46 |
| Tyrosine | 1.71 | 0.96 |
| Phenyl alanine | 2.60 | 2.65 |
| Tryptophane | 1.09 | 0.64 |

The method of the present invention has the following excellent features and advantages as compared with the conventional process for treating excrement.

(1) The excrement can be treated to a state capable of flowing away into river without diluting the raw excrement, so that the present process is economical and it is possible to constitute the treating facilities in a small scale.

(2) The treating period is only about 10 days throughout the whole process, so that the period is very short and the efficiency is high.

(3) All the waste gases formed in the treating processes can be utilized in the treating processes, so that the public nuisance can be prevented.

(4) Useful by-products of the photosynthetic bacteria and Chlorella can be obtained in the treatment of excrement.

The invention will be further explained in detail by the following examples.

EXAMPLE 1

Experiment 1

Condition of cultivating photosynthetic bacteria
- Number of tanks—3
- Residence time in one tank—24 hours
- Culture time—72 hours Condition of cultivating Chlorella:
- Number of tanks—3
- Residence time in one tank—24 hours
- Culture time—72 hours

| | Charging tank | Aerator | Precipitator | First culture tank for photosynthetic bacteria | Third culture tank for photosynthetic bacteria | First culture tank for Chlorella | Third cultural tank for Chlorella | Flowed away water |
|---|---|---|---|---|---|---|---|---|
| Temp. of liquid, ° C | 15 | 38 | 28 | 27 | 28 | 24 | 24 | 18 |
| | | | adjustment | | adjustment | | | |
| pH | 8.7 | 8.4 | 8.2——→ | 7.5 | 8.5——→ | 6.8 | 7.2 | 7.2 |
| Time, hr | | 24 | 12 | ——→72 | | ——→72 | | |
| C.O.D., p.p.m | 3,824 | 1,570 | 1,410 | 760 | 231 | 134 | 15 | 10 |
| B.O.D., p.p.m | 9,740 | 2,325 | 2,032 | 1,225 | 397 | 203 | 15 | 15 |
| N-ammonium, p.p.m | 4,126 | 1,718 | 1,326 | 853 | 352 | 182 | 35 | 31 |
| N-albumino, p.p.m | 783 | 568 | 436 | 214 | 83 | 46 | 12 | 7 |
| Organic acid, p.p.m | 2,620 | 6,215 | 6,852 | 3,726 | 312 | 152 | 28 | 20 |
| Cl ion, p.p.m | 5,230 | 4,257 | 4,027 | 2,180 | 473 | 238 | 105 | 75 |
| Packed cell, volume/l | | | | 0.5 | 7.3 | 0.5 | 4.8 | |

Experiment 2

Condition of cultivating photosynthetic bacteria is the same as in Experiment 1.

Condition of cultivating Chlorella:
- Number of tanks—3
- Residence time in one tank—36 hours
- Culture time—108 hours

| | Charging tank | Aerator | Precipitator | First culture tank for photosynthetic bacteria | Third culture tank for photosynthetic bacteri | First culture tank for Chlorella | Third culture tank for Chlorella | Flowed water away |
|---|---|---|---|---|---|---|---|---|
| Temp. of liquid, ° C | 15 | 39 | 28 | 29 | 29 | 24 | 24 | 18 |
| | | | adjustment | | adjustment | | | |
| pH | 8.8 | 8.5 | 8.2 | →7.2 | 8.5 | →6.7 | 7.8 | 7.7 |
| Time, hr | | 24 | 12 | →72 | | →108 | | |
| C.O.D., p.p.m | 4,930 | 2,316 | 2,010 | 1,125 | 275 | 152 | 5 | 5 |
| B.O.D., p.p.m | 12,430 | 3,741 | 3,437 | 1,726 | 428 | 218 | 10 | 7 |
| N-ammonium, p.p.m | 5,612 | 2,315 | 1,973 | 1,262 | 471 | 254 | 17 | 13 |
| N-albumino, p.p.m | 1,362 | 765 | 627 | 386 | 112 | 57 | 7 | 5 |
| Organic acid, p.p.m | 3,275 | 6,310 | 8,965 | 4,560 | 432 | 223 | 20 | 16 |
| Cl ion, p.p.m | 6,126 | 5,152 | 5,126 | 2,328 | 505 | 241 | 63 | 51 |
| Packed cell, volume/l | | | | 1.0 | 9.5 | 1.0 | 7.2 | |

EXAMPLE 2

An incubation tank (25 x 35 x 45 cm.) made of glass and placed in a phytotron at 30° C. was aerated and into said tank was charged pond soil (10 g. in wet state).

Then 0.1 g. of the photosynthetic bacteria propagated in the process of the invention was introduced into said culture tank and then the amount was gradually increased.

For the comparison dried yeast was introduced into the incubation tank in the same amount in the same manner as described above. After 2 weeks, net animal plankton was collected and an amount of said plankton increased was determined. In the incubation tank given the photosynthetic bacteria plankton was about 10 g., while in the case of the dry yeast plankton was only 3.2 g.

When about 1,000 spawns of animal plankton (Brine Shrimp) in sea-water were introduced into sea-water and the sea-water was somewhat aerated by a compressor while maintaining temperature at 24–27° C. The spawns were incubated after about 24 hours (hatching percentage: about 85%). The photosynthetic bacteria obtained in the above described treatment of excrement were fed thereto in an amount of 100 mg. every day. For the comparison, the dried yeast was fed in the same amount in the same manner as described above.

In both cases, Brine Shrimp grew smoothly and about three weeks after the feeding the female and male were coupled and the formation of ovisac was observed. After the female spawned, said female died but just before spawning, the ovisacs were collected and the hatching percentage was measured. In the section of adding the photosynthetic bacteria said percentage is 87%, while in the section of adding the dry yeast said percentage was only 32%.

Fertilized spawns of goldfish were collected from pond and transferred into an incubator. After several days the young fishes were hatched from the fertilized spawns. The hatched fishes were fed with a commercially available feed for goldfish as a control section and a mixture of said feed with 5% of the photosynthetic bacteria (1 section: 10 fishes, 3 groups). After two weeks, in the section added only the commercially available feed, the young fishes were attacked with mold disease and wholly destroyed. On the other hand, in the section added the photosynthetic bacteria, the young fishes were not killed and grew smoothly.

EXAMPLE 3

When white leghorns (female) (1 section: 5 hens, 3 groups) were given with each of a commercially available composite feed and a mixture of said feed with 5% of the photosynthetic bacteria and Chlorella, the number and color of eggs were compared. In the section added only the commercially available composite feed, the color of egg not so yellow and the number of eggs in one month was 24 on an average, while in both the sections added the photosynthetic bacteria and Chlorella, the color of egg was highly yellowish orange and bright and had commercial value and the average number of eggs was 26.5 in the section added the photosynthetic bacteria and 26.8 in the section added Chlorella.

EXAMPLE 4

Paddy rice plants were planted in 1/5000 acre pot (one section: 3 ports, 3 groups) and cultivated by applying 0.5 g. of every nitrogen, phosphoric acid and potassium as the basic fertilizer, then in the beginning of August, an additive fertilizer of ammonium sulfate as chemical fertilizer and Chlorella or the photosynthetic bacteria as organic fertilizer was added respectively (0.25 gram of nitrogen, respectively). The average number of ears was 9 in non-fertilizer section (1), 25 in the basic fertilizer plus the additive fertilizer of the photosynthetic bacteria (2), 25 in the basic fertilizer plus the additive fertilizer of Chlorella (3) and 30 in the basic fertilizer plus the additive fertilizer of ammonium sulfate (4), respectively. The total number of the grain was 600.3 in section (1), 2,302 in section (2), 1,815 in section (3) and 2,019 in section (4) on an average and the total weight of the grains was 15.3 g. in section (1), 52.3 g. in section (2), 44.5 g. in section (3) and 46.2 g. in section (4) on an average, respectively. From the foregoing description, in the section added the photosynthetic bacteria, the increase of yield was apparently recognized.

What is claimed is:

1. A process for treating excrement, which comprises decomposing the excrement under an aerobic atmosphere to form organic acids and other low molecular weight substances, transferring the decomposed excrement into a sealed culture tank, inoculating, cultivating and propagating photosynthetic bacteria therein under anaerobic atmosphere while irradiating same with light, separating the propagated photosynthetic bacteria from the excrement, transferring the resulting excrement into a culture tank, inoculating, cultivating and propagating Chlorella therein under an aerobic condition while irradiating same with light and separating the propagated Chlorella from the excrement, whereby the excrement is purified.

2. The process as claimed in claim 1, wherein said photosynthetic bacteria are Athiorhodaceae.

3. The process as claimed in claim 1, wherein the decomposition of the excrement under an aerobic atmosphere is effected by blowing air into an aerator while stirring.

4. The process as claimed in claim 3, wherein a defoaming agent, a surfactant, air or recycled excrement is spread on the liquid surface to effect defoaming.

5. The process as claimed in claim 1, wherein a waste gas generated in the aerator is introduced into a culture tank for Chlorella to prevent odor and promote propagation of Chlorella.

6. The process as claimed in claim 1, wherein the excrement decomposed under an aerobic atmosphere is sterilized.

7. The process as claimed in claim 6, wherein the sterilized excrement is treated with an enzyme selected from the group consisting of cellulase, amylase and lipase.

8. The process as claimed in claim 1, wherein said photosynthetic bacteria is cultivated at a temperature of about 30° C. for about 70 to 100 hours.

9. The process as claimed in claim 1, wherein the photosynthetic bacteria is cultivated by transferring a culture system constituted by a plurality of sealed culture tanks successively.

10. The process as claimed in claim 9, wherein the cultivated solution in the last culture tank is returned back to the first culture tank.

11. The process as claimed in claim 1, wherein the Chlorella is cultivated at a temperature of about 25° C. for 3 to 5 days.

12. The process as claimed in claim 1, wherein the Chlorella is cultivated by transferring a culture system composed of a plurality of aerobic culture tanks successively.

13. The process as claimed in claim 12, wherein the cultivated solution in the last culture tank is returned back to the first culture tank.

References Cited

UNITED STATES PATENTS

| | | | |
|---|---|---|---|
| 2,867,945 | 1/1959 | Gotaas et al. | 210—15 |
| 3,356,609 | 12/1967 | Bruemmer | 210—15 |
| 3,444,647 | 5/1969 | Takahashi | 210—11 |
| 3,464,919 | 9/1969 | Barta et al. | 210—11 |

REUBEN FRIEDMAN, Primary Examiner

C. N. HART, Assistant Examiner

U.S. Cl. X.R.

71—9, 10, 12; 99—9; 210—11, 16